United States Patent
Howell

[15] 3,697,095
[45] Oct. 10, 1972

[54] ADJUSTABLE AUXILIARY HANDLE FOR SHOPPING CART

[72] Inventor: Peter T. Howell, 69 Pinehurst Boulevard, Apt 3D, New York, N.Y. 10033

[22] Filed: May 14, 1971

[21] Appl. No.: 143,402

[52] U.S. Cl........280/47.26, 280/47.17, 280/47.37 R
[51] Int. Cl. ...........................................B62b 5/06
[58] Field of Search........280/47.37 R, 47.17, 47.24, 280/47.26; 52/584; 211/177; 74/523, 524, 525

[56] References Cited
UNITED STATES PATENTS 2,569,450  10/1951  Bouton........................52/584
2,639,163  5/1953  Walker....................280/47.26
3,513,952  5/1970  Warner................280/47.37 R Primary Examiner—Benjamin Hersch
Assistant Examiner—D. M. Mitchell
Attorney—Sandoe, Hopgood and Calimafde

[57] ABSTRACT

A shopping cart is provided with an adjustable handle which is movable transversely across the handle of the cart, to thereby facilitate movement of the cart in different orientations.

3 Claims, 3 Drawing Figures

PATENTED OCT 10 1972  3,697,095

INVENTOR.
PETER T. HOWELL
BY
Sandoe, Hopgood & Calimafde
ATTORNEYS

ADJUSTABLE AUXILIARY HANDLE FOR SHOPPING CART

The present invention relates generally to handles for use or article conveyors, and more particularly to an adjustable handle for use on an otherwise conventional shopping cart.

Many shoppers, particularly those at urban and suburban supermarkets, employ a foldable shopping cart to carry their purchased items from the market to their home. The typical shopping cart includes an open-top, rectangular article container carrying a pair of rearwardly disposed wheels at its lower end. A frame including an upper transverse arm is secured to the article container. To convey the cart between its destinations, the shopper grasps the transverse arm, pivots the cart onto the rear wheels, and then usually proceeds to pull the cart behind her.

This procedure is, however, an awkward one, primarily since the transverse arm of the cart frame is often too low to be grasped by the shopper without bending, particularly when the shopper is taller than average. When the distance between the shopper's home and the market is great, the trip with the shopping cart may often turn out to be an arduous journey. As a result of this inconvenience and discomfort, the shopper may forego the use of the cart and instead carry the heavy bags by hand to his home—an equally unpleasant situation.

There are also occasions in which a shopper may wish to grasp the cart handle at an off-center position, to thereby maintain the cart to her side rather than to her rear. This arrangement of the cart, for example, permits the shopper to maintain surveillance over the contents of the cart, particularly when the shopper is walking through a neighborhood in which there is a likelihood of some of the cart's contents being purloined.

It is a primary object of the invention to provide a shopping cart that is more convenient to employ.

It is a further object of the invention to provide a handle for use on a shopping cart that can be adjusted both in length as well as in its transverse position on the cart, to thereby enable the more convenient use of the cart.

It is another object of the invention to provide a handle for a shopping cart which enables the cart to be transported to the side of the shopper when desired to provide greater visibility of the contents of the cart.

In accordance with the present invention, a handle is provided for releasable attachment to the conventional cart handle bar. The supplemental handle of the invention may be released when desired and repositioned transversely with respect to the conventional handle, to thereby enable the shopper to place the cart to his side rather than to his rear. The handle may also be extendable in the vertical direction to enable the cart to be conveniently grasped by individuals of different heights.

As herein specifically described, the shopping cart handle of the invention includes first and second arms which are releasably joined to one another at their upper and lower ends, and are arranged on the opposing sides of the conventional cart handle frame along transverse and vertical extents thereof. A third arm, which is adapted to be grasped by the shopper, is joined to the upper ends of the first and second arms and extends normally in a vertical orientation.

To reposition the third arm transversely along the shopping cart, the elements fastening the first and second arms are loosened and the handle assembly is slid along the conventional cart handle bar until the vertical grasping arm is at its desired transverse position with respect to the cart, after which the fastening elements are retightened to thereby fix the third arm at its desired position.

To the accomplishment of the above and to such further objects as may hereinafter appear, the present invention relates to a shopping cart with an adjustable handle, substantially as defined in the appended claims and as described in the following specification taken together with the accompanying drawing in which:

Figure 1:
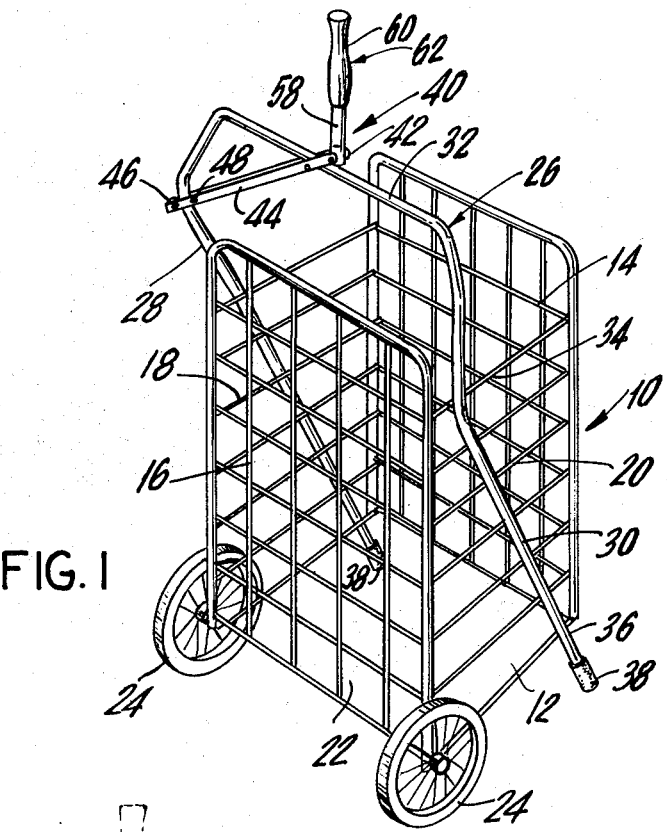
FIG. 1 is a perspective view of the handle of the invention as affixed to an otherwise conventional shopping cart.

The present invention is directed to an improved handle arrangement for use on a hand-drawn vehicle such as a shopping cart generally designated 10 in FIG. 1. As is conventional, cart 10 includes a collapsible, wire rectangular container 12 open at its upper end to receive and store articles therein. Section 12 includes front and rear panels 14 and 16, side panels 18 and 20, and a bottom or floor panel 22. The lower wire member of rear panel 16 projects beyond the side panels and a pair of wheels 24 is rotatably mounted on these extensions.

Figure 2:
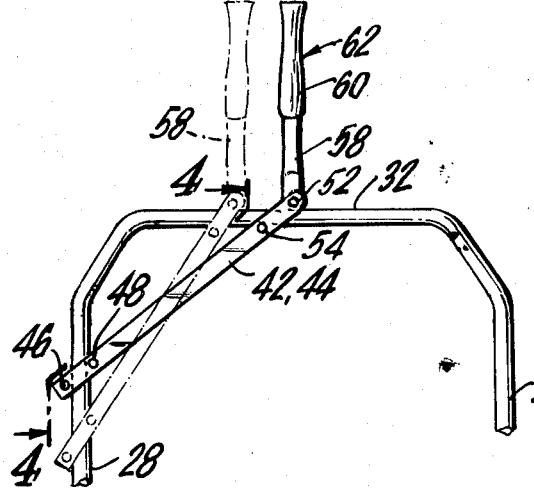
FIG. 2 is a fragmentary elevation of the handle of the invention shown in solid lines in one transverse position, and in broken lines in an alternate transverse position.

A tubular frame member 26 that includes generally vertical legs 28 and 30 and a transverse arm 32 extending between legs 28 and 30, is secured to container 12. As shown in FIG. 2, the securing of frame 26 onto section 12 is achieved by means of fastening elements 34 and 36 respectively securing the legs 28 and 30 to the upper and lower ends of side panels 18 and 20 of container 12. Rubber feet 38 are fastened onto the lower ends of legs 18 and 20.

In use, cart 10 is tilted backwardly such that feet 38 are raised off the pavement surface, the user grasps transverse arm 32 and thereafter either pulls or pushes the cart, the cart riding solely on the peripheries of wheels 24. When the shopper arrives at her destination, the cart is lowered such that it rests on feet 38 as well as on wheels 24.

In accordance with the present invention, a supplemental, adjustable handle generally designated 40 is affixed to frame 26 to facilitate the handling of the shopping cart. As shown, handle 40 comprises first and second, substantially identical, rectangular strips 42 and 44 arranged in parallel registration on each side of member 26. As seen best in FIGS. 2 and 3, strips 42 and 44 respectively extend above and beyond transverse arm 32 and vertical 28 of frame 26.

Figure 4:
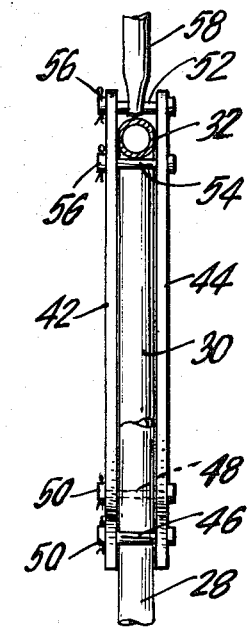
FIG. 4 is a cross section taken along the line 4—4 of FIG. 2.

Fastening elements such as screws 46 and 48 are passed through registering openings in the lower ends of strips 42 and 44 to each side of leg 28, and suitable nuts such as wing nuts 50 are threaded onto the free ends of these screws, as seen in FIG. 4. Similarly, screws 52 and 54 are passed through registering openings formed in the upper ends of strips 42 and 44 and are secured at their free ends by nuts 56, which are also preferably in the form of wing nuts.

The lower end of a tubular grasping member 58 passes between the upper ends of strips 42 and 44 and is coupled to these strips by means of the upper one of screws 56 that passes through an opening formed through the lower end of member 58. To complete handle 40, a grip 60 made of a suitable material such as rubber or plastic is fitted over the upper end of member 58, to facilitate the secure grasping of the handle by the shopper.

In accordance with the invention, the position of handle 42 transversely along the cart frame handle is adjustable at the shopper's selection, to thereby permit the cart to be handled in an optimum manner for different situations confronted by the shopper.

To this end, nuts 50 and 56 fastening the ends of strips 42 and 44 and normally securing them in a fixed position with respect to member 26 can be loosened to permit the still fastened strips to be moved transversely along transverse member 32 and vertically along vertical member 28, thereby causing member 58 to also move transversely along member 32. The loosened handle is moved in this manner, such as from the position shown in the solid lines in FIG. 2, until member 58 is at the desired position, such as at the position of the handle shown in the broken lines in FIG. 2. At this time, nuts 50 and 56 are retightened to fixedly resecure the handle members in the new position. The handle may be thereafter again repositioned merely by repeating the nut loosening and tightening procedure just described.

As shown, grasping member 58 may further include a telescoping member which is normally locked in a desired position by a set screw 62 projecting through an opening formed in grip 60. When desired to raise the level of grip 60, to further increase the east of cart handling, screw 62 is loosened to extend the inner telescoping member and grip 60 as shown by the broken line vertical position of the grip in FIG. 2.

Figure 3:
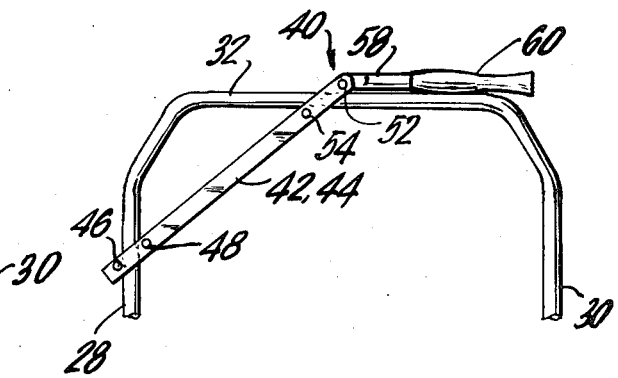
FIG. 3 is a view similar to FIG. 2 showing the grasping arm pivoted over to a position for storage.

Moreover, as shown in FIG. 3, to facilitate storage of the cart between periods of use, the upper one of nuts 56 may be loosened to permit grasping member 58 to be pivoted downwardly into a horizontal position atop transverse arm 32.

The improved shopping cart handle of the invention thus permits the ready adjustment of the handle in both the transverse and vertical planes. The handle may be readily installed and utilized in its various positions even by an individual having a minimum amount of mechanical aptitude such as a typical housewife. Moreover, the components of the handle are low-priced, thus enabling its sale at a low price to the consumer public, which further increases the appeal and use of the handle.

Thus while only a single embodiment of the present invention has been herein specifically described, it will be apparent that modifications may be made therein without departing from the spirit and the scope of the invention.

I claim:

1. An auxiliary handle for use on an article container such as a shopping cart or the like of the type having a frame including a generally transverse arm and contiguous generally vertical arm, said auxiliary handle comprising first and second elongated strip members, means for respectively, releasably securing said strip members to one another at their upper and lower ends at the transverse and vertical arms of said frame, said securing means being effective when in a locked condition to fixedly position said auxiliary handle on said frame at a desired location thereon, and when in a released condition, to permit transverse movement of said auxiliary handle along said transverse arm of said frame, and a grasping member, said securing means including first and second locking means respectively passing through a pair of aligned openings formed in one end of said strip members above and below said transverse arm of said transverse arm, said first locking means also passing through can opening in one end of said grasping member for securing the latter to the upper end of said first and second strip members.

2. The auxiliary handle of claim 1, in which said securing means further includes third and fourth locking means respectively passing through a second pair of aligned openings in the other end of said first and second strip members at each side of said vertical arm of said frame.

3. The auxiliary handle of claim 2, in which said grasping member further includes a telescoping member capable of being positioned vertically to thereby selectively vary the length of said grasping member.

* * * * *